(12) United States Patent
Furuichi et al.

(10) Patent No.: US 7,421,161 B2
(45) Date of Patent: Sep. 2, 2008

(54) OPTICAL POWER MONITOR AND ITS MANUFACTURING METHOD

(75) Inventors: Shinji Furuichi, Mohka (JP); Masaru Suzuki, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/720,402

(22) PCT Filed: Dec. 8, 2005

(86) PCT No.: PCT/JP2005/022521

§ 371 (c)(1),
(2), (4) Date: May 29, 2007

(87) PCT Pub. No.: WO2006/080143

PCT Pub. Date: Aug. 3, 2006

(65) Prior Publication Data

US 2008/0044135 A1    Feb. 21, 2008

(30) Foreign Application Priority Data

Jan. 31, 2005    (JP) .............................. 2005-022927

(51) Int. Cl.
*G02B 6/32* (2006.01)
*G02B 6/36* (2006.01)

(52) U.S. Cl. .............................. 385/34; 385/33; 385/48; 385/88; 385/92

(58) Field of Classification Search .................. 385/31, 385/33–35, 48, 52, 88, 89, 92, 93
See application file for complete search history.

(56) References Cited

U.S. PATENT DOCUMENTS

| 5,790,314 | A | 8/1998 | Duck et al. | |
| 6,404,954 | B1 * | 6/2002 | Zhu et al. | 385/34 |
| 6,445,856 | B1 * | 9/2002 | Yang | 385/48 |
| 6,603,906 | B2 | 8/2003 | Qin et al. | |

(Continued)

FOREIGN PATENT DOCUMENTS

JP    62-269909    11/1987

(Continued)

*Primary Examiner*—Sung Pak
*Assistant Examiner*—Daniel Petkovsek
(74) *Attorney, Agent, or Firm*—Sughrue Mion, PLLC

(57) ABSTRACT

An optical power monitor comprising a pig-tail fiber and a GRIN lens opposed to each other with a spacing and each having an end face (angled face) angled with respect to the axis, being low on reflection loss and able to be easily assembled. The pig-tail fiber and the GRIN lens are fixed in respective sleeves having axial end faces adhered to each other. At least one of the pig-tail fiber and the GRIN lens has an arc-segmental end face directed in its axial direction at the tip of its angled face. The arc-segmental end face is positioned in the same plane as the axial end face of the sleeve of the one. The axis of the sleeve of the one is kept vertical to the axial end face of the sleeve of the one. It can be prevented that the axial tip of the other enters the sleeve of the one and comes into contact with an inner wall of the sleeve of the one. Therefore, the assembling man-hours needed to adjust their relative positions can be reduced, and the assembling yield can be improved.

3 Claims, 6 Drawing Sheets

U.S. PATENT DOCUMENTS

| | | | |
|---|---|---|---|
| 6,687,434 B2 | 2/2004 | Ishikawa | |
| 6,817,078 B2 | 11/2004 | Hwang et al. | |
| 6,895,144 B2 * | 5/2005 | Shi | 385/33 |
| 7,044,660 B2 * | 5/2006 | Pan et al. | 385/93 |
| 7,255,497 B2 * | 8/2007 | Suzuki et al. | 385/93 |
| 7,313,300 B1 * | 12/2007 | Pin et al. | 385/33 |
| 2002/0118920 A1 * | 8/2002 | Francis et al. | 385/33 |
| 2004/0208442 A1 * | 10/2004 | Shi et al. | 385/34 |

FOREIGN PATENT DOCUMENTS

| | | |
|---|---|---|
| JP | 10-511476 A | 11/1998 |
| JP | 11-133264 | 5/1999 |
| JP | 2001-013362 A | 1/2001 |
| JP | 2002-196182 A | 7/2002 |
| JP | 2002-202431 A | 7/2002 |
| JP | 2003-202262 A | 7/2003 |
| JP | 2003-241010 A | 8/2003 |

\* cited by examiner

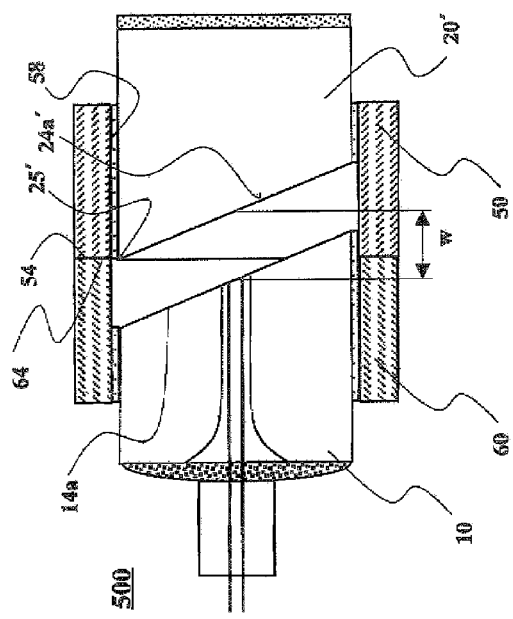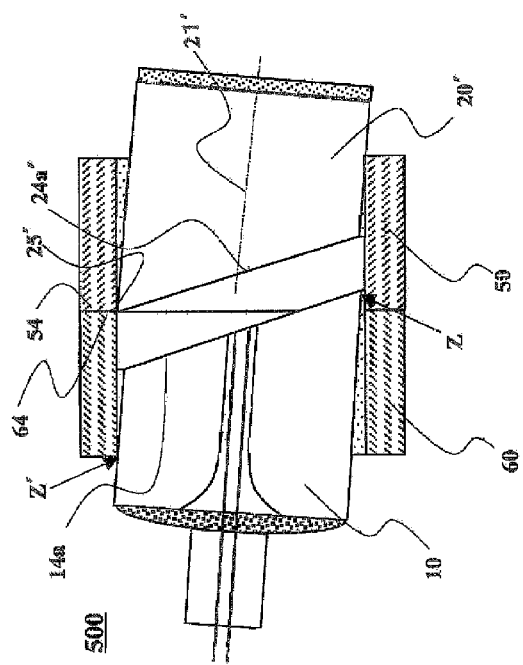
FIG. 5A
FIG. 5B

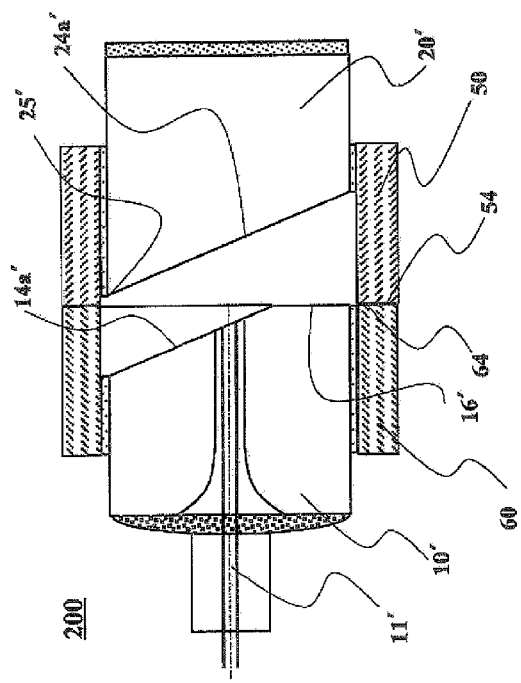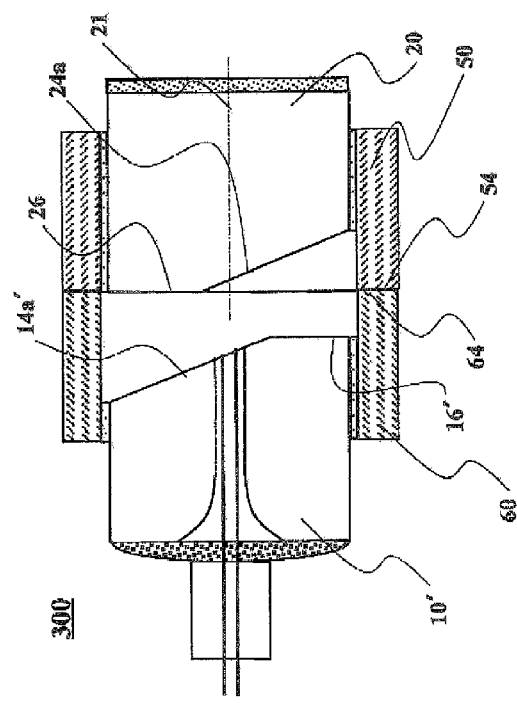

OPTICAL POWER MONITOR AND ITS MANUFACTURING METHOD

TECHNICAL FIELD

The present invention relates to an optical power monitor for measuring the strength or energy of light of an optical signal in an optical fiber, particularly to an optical power monitor having a structure to be easily assembled.

BACKGROUND ART

There is an optical power monitor in which a part of an optical signal propagating in an optical fiber is branched to detect its strength. Optical power monitors are disclosed in Patent Documents 1, 2 and 3. Since the optical power monitors disclosed have the same basic configuration, the illustration in FIG. 3 of Patent Document 1 is shown in FIG. 8, and the structure will be described with reference to FIG. 8.

An optical power monitor 800 shown in FIG. 8 includes an optical fiber 812 on an incoming side, an optical fiber 813 on an outgoing side, a two-core capillary 810 (corresponding to "pig-tail fiber" in the present invention), a cylindrical gradient index lens 820 having the same diameter as the two-core capillary 810 (corresponding to "Graded Index Lens", i.e. "GRIN lens" in the present invention), a dot mirror 830 (corresponding to "tap film" in the present invention), a photodetector 840 (corresponding to "photo-diode" in the present invention), an optical receiver circuit 844, and an indicator 846.

A light signal input to the optical fiber 812 on the incoming side passes through the two-core capillary 810 and is focused onto the dot mirror 830 by the gradient index lens 820. Most of the focused light is reflected by a surface of the dot mirror 830, goes back to the gradient index lens 820, and output through the two-core capillary 810 by the optical fiber 813 on the outgoing side. Light passing through the dot mirror 830 is detected by the photodetector 840, and the light signal is converted into an electric signal. The electric signal passes through the optical receiver circuit 844 and is indicated as the strength of light by the indicator 846. Unless otherwise specially specified herein, "energy of light" and "strength of light" may be used as synonyms.

The two-core capillary, i.e. a pig-tail fiber or a capillary glass ferrule, and the gradient index lens, i.e. a GRIN lens are positioned opposed to and at a predetermined distance from each other. A pig-tail fiber and a GRIN lens shown in Patent Documents 1, 5 and 6 have their opposite end faces forming an angle of about 8° with an axis (optical axis), and in Patent Documents 2 to 4, a pig-tail fiber and a GRIN lens having their opposite end faces perpendicular to an axis are disclosed. In order that the end faces perpendicular to the axes of the pig-tail fiber and the GRIN lens as shown in Patent Documents 2 to 4 are positioned to be opposed to each other at the predetermined distance therebetween, the opposite end faces are adjusted to be parallel to each other, providing easy assembling. However, a part of the light is reflected by the end faces of the pig-tail fiber and the GRIN lens and goes back in the core, causing interference with light progressing later to generate reflection loss of light. In order to reduce the reflection loss, as disclosed in Patent Documents 5 and 6, the opposite end faces are angled by an angle of about 6° to about 10°, an average angle of 8°. The reflection loss can be reduced to 50 to 55 (dB) by angling the opposite end faces relative to the axis. However, it becomes very difficult to assemble the pig-tail fiber and the GRIN lens.

Patent Document 1: Japanese Patent Laid-Open No. 2003-202262

Patent Document 2: Japanese Patent Laid-Open No. 62-269909

Patent Document 3: U.S. Pat. No. 6,603,906

Patent Document 4: U.S. Pat. No. 5,790,314

Patent Document 5: Japanese Patent Laid-Open No. 2001-013362

Patent Document 6: Japanese Publication of International Patent Application No. 10-511476

DISCLOSURE OF THE INVENTION

Problems to be Solved by the Invention

The present invention has been made in order to solve the problems described above, and an object thereof is to provide an optical power monitor which includes a pig-tail fiber and a GRIN lens of which opposite end faces are angled faces relative to axes, has lower reflection loss and can be easily assembled, and its manufacturing method.

Means for Solving the Problems

An optical power monitor of the present invention comprises:

a pig-tail fiber having two optical fibers aligned parallel to and at a small distance from each other and an end face having ends of the two optical fibers on the end face which is an angled face having a perpendicular line at a certain angle with a pig-tail fiber axis;

a columnar GRIN lens having two opposite end faces, one of which faces the angled face of the pig-tail fiber at a predetermined spacing with the angled face of the pig-tail fiber and is an angled face having a perpendicular line at a certain angle with a columnar GRIN lens axis, and the other of which has a tap film formed on it;

a first sleeve having a through-hole, in which the columnar GRIN lens is fixed, and an end face, which is disposed on a side of the angled face of the columnar GRIN lens and has a perpendicular line in an axial direction of the first sleeve;

a second sleeve having a through-hole, in which the pig-tail fiber is fixed, and an end face, which is disposed on a side of the angled face of the pig-tail fiber, has a perpendicular line in an axial direction of the second sleeve, and is in contact with the end face of the first sleeve; and a photo-diode disposed to face the tap film of the columnar GRIN lens. And, at least one of the pig-tail fiber and the columnar GRIN lens has an arc-segmental end face with a perpendicular line in an axial direction of the at least one, which arc-segmental end face is formed by removing a portion of an axial tip of the angled face of the at least one.

For inputting and outputting of an optical signal to and from the optical power monitor according to the present invention, two optical fibers and a two-core capillary may be used. However, an easily handled pig-tail fiber in which an optical fiber and a support are integrally formed may be preferably used. Most of the optical signal input through the pig-tail fiber is reflected by the tap film formed on a rear end face of the GRIN lens, and a part of the input light passes through the tap film to reach the photo-diode. The tap film is a dielectric multilayer film composed of $SiO_2$, $TiO_2$, $Ta_2O_5$ etc., and formed by vacuum deposition etc. With varying a thickness of each layer, a ratio (tap ratio) of reflection of the optical signal and the transparency strength can be changed.

The strength of light passing through the GRIN lens to reach the photo-diode, preferably, is not smaller than 0.5% and not greater than 20% of the strength of light input on the pig-tail fiber. When the strength of light reaching the photo-diode is below 0.5% of the strength of the light input, it is difficult for the photo-diode to accurately detect the strength of light. When the strength of light reaching the photo-diode is over 20% of the strength of the light input, the energy of light used as the optical signal which is reflected by the tap film and output by the pig-tail fiber is too attenuated. Further, the strength of light entering the photo-diode may be too large to cause saturation because of being beyond detection capability. A half mirror such as a dot mirror may be used instead of the tap film. Moreover, to effectively detect the strength of the optical signal using the photo-diode, a lens may be preferably provided in front of the photo-diode.

The pig-tail fiber and the GRIN lens having the tap film are bonded by adhesive agent and fixed in a nearly cylindrical sleeve. The sleeve may be preferably made of glass or ceramics. The sleeve of glass has the thermal expansion coefficient approximate to those of the pig-tail fiber and the GRIN lens, and therefore, there is provided an advantage that an optical error is not likely to occur against temperature change. Epoxy resin may be preferably used to bond and fix the pig-tail fiber, the GRIN lens and the sleeve. The epoxy resin may be easily handled and has a small thermal expansion coefficient against temperature change. The GRIN lens and the photo-diode having a lens are bonded by adhesive agent and fixed in another sleeve having a cylindrical outline. Material of the sleeve is preferably glass or ceramics similarly to the sleeve combined with the pig-tail fiber or the GRIN lens, and epoxy resin is preferably used to bond and fix them.

The opposite end faces of the pig-tail fiber and the GRIN lens are formed into angled faces at an angle of about 6° to about 10°, preferably about 8°, and thereby, light reflected by the end faces of the pig-tail fiber and the GRIN lens can be prevented from going back. While the GRIN lens is fixed, a position of the pig-tail fiber is adjusted by slightly moving the pig-tail fiber in the X, Y and Z axis directions, and slightly rotating it around the X, Y and Z axes to minimize the reflection loss and maximize the strength of the outgoing light. While the adjusted position of the pig-tail fiber relative to the GRIN lens is kept, these are bonded by epoxy resin and fixed through the first sleeve and the second sleeve. An arc-segmental end face may be provided on one or both of the GRIN lens and the pig-tail fiber.

In the optical power monitor described above according to the present invention, the arc-segmental end face provided on at least one of the GRIN lens and the pig-tail fiber is preferably positioned in the same plane as the end face of the sleeve corresponding to the at least one.

The positions of the pig-tail fiber and the GRIN lens are fixed by bonding using adhesive agent to fix the GRIN lens in a through-hole of the first sleeve, bonding using adhesive agent to fix the pig-tail fiber in a through-hole of the second sleeve, and further bonding the end face of the first sleeve to the end face of the second sleeve to fix. When the end faces of the first sleeve and the second sleeve are bonded and fixed to each other, if an axial tip of the GRIN lens projects beyond the end face of the first sleeve, the tip gets into the second sleeve. If the axial tip of the GRIN lens gets into the second sleeve, the tip of the GRIN lens is brought into contact with an inner wall of the second sleeve, and thereby, a spacing between the pig-tail fiber and the GRIN lens can not be set to a predetermined value. Further, the axial tip of the GRIN lens may get chipped, causing a broken piece to enter between the pig-tail fiber and the GRIN lens. Therefore, preventing the axial tip of the GRIN lens from getting into the second sleeve allows assembling to be easy, and the axial tip of the GRIN lens can be prevented from getting chipped. Also, an axial tip of the pig-tail fiber, similarly, is preferably prevented from getting into first sleeve.

The arc-segmental end face provided on the angled face of the GRIN lens is positioned in the same plane as the end face of the first sleeve, and thereby, it is easy to assemble so as to align a center line (optical axis) of the GRIN lens to be perpendicular to the end face of the first sleeve. Because the GRIN lens and the first sleeve can be accurately assembled in a perpendicular form, assembling the pig-tail fiber and the second sleeve also is easy. Therefore, accurate assembling may reduce a difference between an outer diameter of the GRIN lens and an inside diameter of the first sleeve to decrease a thickness of adhesive agent, controlling variation in position of each component to a minimum due to a thermal expansion difference even if an external temperature changes. The pig-tail fiber and the second sleeve also are the same as the aforementioned.

In the optical power monitor described above according to the present invention, a height of the arc-segmental end face provided on at least one of the pig-tail fiber and the columnar GRIN lens, defined by a distance between a center of its circular arc and its chord is preferably 20 to 40% of a diameter of the at least one.

When the height of the arc-segmental end face is below 20% of the diameter of the GRIN lens, if the arc-segmental end face of the GRIN lens is positioned in the same plane as the end face of the first sleeve, in order to set a spacing between the arc-segmental end face of the GRIN lens and the angled face of the pig-tail fiber to a predetermined value, the axial tip of the angled face of the pig-tail fiber may get into the first sleeve. When the height of the arc-segmental end face is over 40% of the diameter of the GRIN lens, the angled face may have no effects. When the arc-segmental end face is provided on either the pig-tail fiber or the GRIN lens, the height is more preferably 30 to 40% of the diameter. When the arc-segmental end face is provided on both of the pig-tail fiber and the GRIN lens, the height is more preferably 20 to 30% of the diameter.

An manufacturing method of an optical power monitor according to the present invention utilizes: a pig-tail fiber having two optical fibers aligned parallel to and at a small distance from each other and an end face having ends of the two optical fibers on the end face, which is an angled face having a perpendicular line at a certain angle with a pig-tail fiber axis; a columnar GRIN lens having two opposite end faces, one of which is an angled face having a perpendicular line at a certain angle with a columnar GRIN lens axis, and the other of which has a tap film formed on it. At least one of the pig-tail fiber and the columnar GRIN lens has an arc-segmental end face formed by removing a portion of an axial tip of the angled face of the at least one and has a perpendicular line in an axial direction of the at least one. The method further uses a first sleeve having a through-hole, in which the columnar GRIN lens is able to be inserted, and an end face with a perpendicular line in an axial direction of the first sleeve; a second sleeve having a through-hole, in which the pig-tail fiber is able to be inserted, and an end face with a perpendicular line in an axial direction of the second sleeve; and a photo-diode which is able to be disposed to face the tap film of the columnar GRIN lens. And, one of the pig-tail fiber and the columnar GRIN lens, which one has the arc-segmental end face, is combined with a sleeve corresponding to the one, inserted into a through-hole of the sleeve and fixed in the sleeve to position the arc-segmental end face of the one in the same plane as the end face of the sleeve. The other of the pig-tail fiber and the columnar GRIN lens is combined with a sleeve corresponding to the other, and inserted into a through-hole of the sleeve to position the end face of the sleeve on a side of the angled face of the other. The pig-tail fiber and the columnar GRIN lens are positioned so as to face the angled face of the pig-tail fiber to the angled face of the columnar GRIN lens, an incidence light is let to enter through one of the two optical fibers disposed in the pig-tail fiber, an output light from the other of the two optical fibers is monitored to adjust a position relationship between the pig-tail fiber and the columnar GRIN lens, and the pig-tail fiber and the columnar GRIN lens are held at the desirable position. The other of the pig-tail fiber and the columnar GRIN lens is fixed in the through-hole of the sleeve corresponding to the other, and the end face of the sleeve is fixed to an end face of the sleeve corresponding to the one at the position to assemble the pig-tail fiber and the columnar GRIN lens. And, the photo-diode is positioned to face the tap film of the columnar GRIN lens.

After the optical power monitor is manufactured, an outside of the optical power monitor is preferably covered with opaque material to avoid an interference from external light. The optical power monitor may be covered by a metal case, coated with paint having a light blocking effect, or covered with heat shrinkable tube having a light blocking effect.

ADVANTAGES OF THE INVENTION

The optical power monitor, which is configured in a manner that the arc-segmental end face is provided on the angled face of either one of the GRIN lens and the pig-tail fiber, or on both the opposite angled faces, the arc-segmental end face is positioned in the same plane as the end face of the first sleeve or the second sleeve, the GRIN lens is bonded and fixed in the first sleeve, and the pig-tail fiber is bonded and fixed in the second sleeve, can be assembled without the axial tip of the angled face of the GRIN lens or the pig-tail fiber being brought into contact with an inner wall of the second sleeve / the first sleeve, and therefore it has provided reduction of assembling man-hours and an increase in assembling yield.

BRIEF DESCRIPTION OF DRAWINGS

FIGS. 5A and 5B are cross-sectional views showing fiber lens units for optical power monitors of comparative examples;

FIG. 6 is a cross-sectional view showing a fiber lens unit for an optical power monitor of EXAMPLE 2;

FIG. 7 is a cross-sectional view showing a fiber lens unit for an optical power monitor of EXAMPLE 3.

Figures 1, 2:
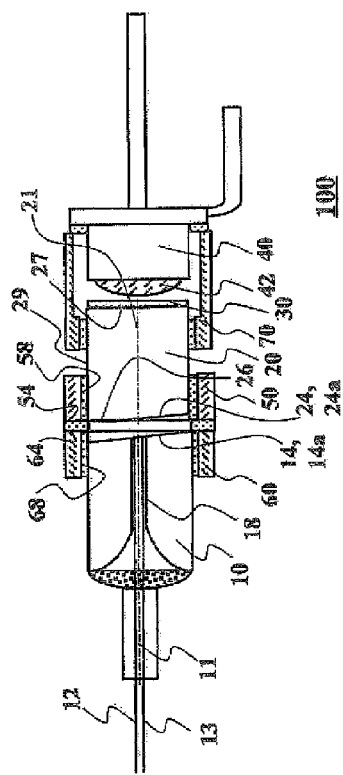
FIG. 1 is a cross-sectional view showing an optical power monitor of EXAMPLE 1 according to the present invention.
FIG. 2 is a perspective view of a columnar GRIN lens used in the optical power monitor of EXAMPLE 1.

| EXPLANATION OF REFERENCE NUMERALS | |
|---|---|
| 10, 10' | pig-tail fiber |
| 11, 11' | axis |
| 12, 13 | optical fiber |
| 14 | end face |
| 14a, 14a' | angled face |
| 16' | arc-segmental end face |
| 20, 20' | (columnar) GRIN lens |
| 21 | axis |
| 24, 27 | end face |
| 24a, 24a' | angled face |
| 25, 25' | (axial) tip |
| 26 | arc-segmental end face |
| 30 | tap film |
| 40 | photo-diode |
| 50 | first sleeve |
| 54 | end face |
| 58 | through-hole |
| 60 | second sleeve |
| 64 | end face |
| 68 | through-hole |
| 100, 200, 300 | optical power monitor |

BEST MODE FOR CARRYING OUT THE INVENTION

Figure 3:
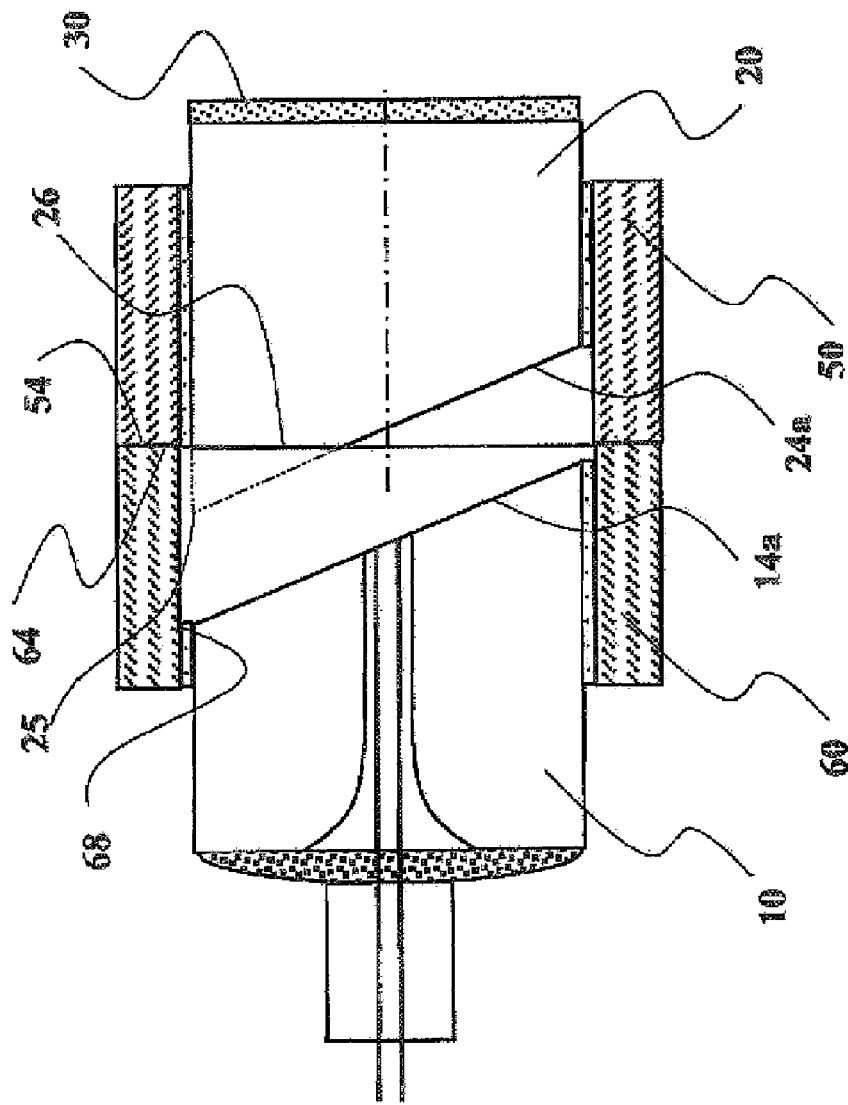
FIG. 3 is a cross-sectional view showing a fiber lens unit for the optical power monitor of EXAMPLE 1.
Figures 4A, 4B:
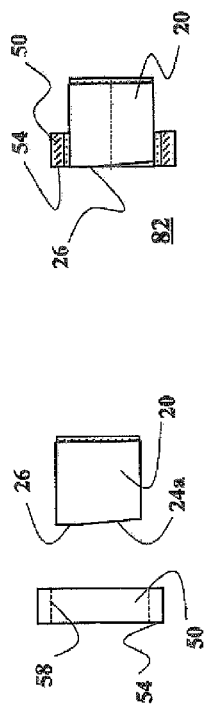
FIGS. 4A through 4F are explanatory views of the assembling of the optical power monitor of EXAMPLE 1.
Figure 4C:
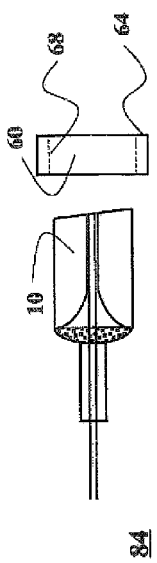
Figure 4D:
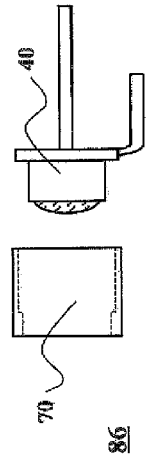
Figure 4E:
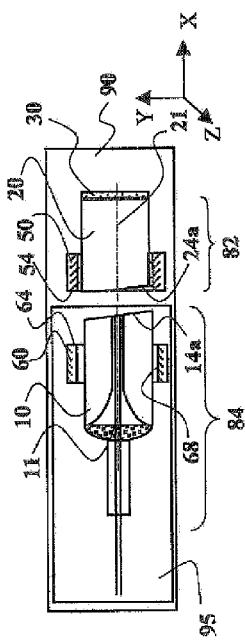
Figure 4F:
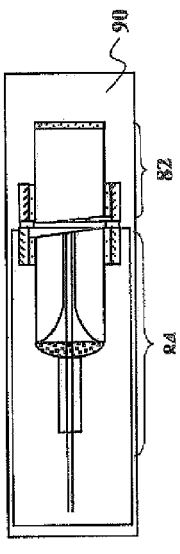
Figure 8:
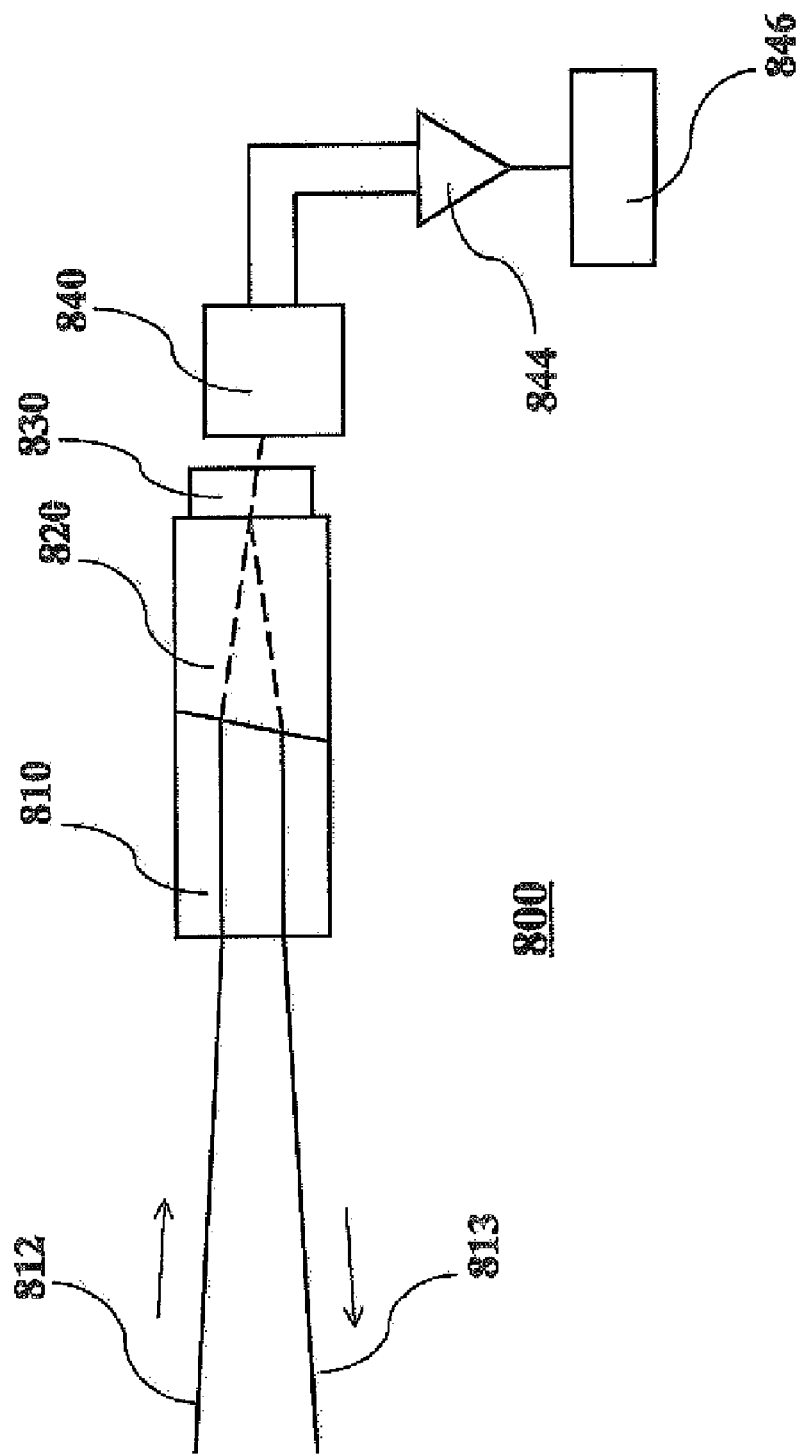
FIG. 8 is an explanatory view of an optical power monitor described in Patent Document 1.

The present invention will be hereinafter described in detail in relation to examples with reference to the accompanying drawings. FIG. 1 is a cross-sectional view showing an optical power monitor of EXAMPLE 1 according to the present invention. FIG. 2 is a perspective view of a columnar GRIN lens used in the optical power monitor of EXAMPLE 1. FIG. 3 is a cross-sectional view showing a fiber lens unit for the optical power monitor of EXAMPLE 1. Further, FIGS. 4A through 4F are explanatory views of the assembling of the optical power monitor of EXAMPLE 1. FIGS. 5A and 5B are cross-sectional views showing a fiber lens unit for an optical power monitor of a comparative example. Further, FIGS. 6 and 7 are cross-sectional views showing a fiber lens unit of an optical power monitor of EXAMPLE 2 and EXAMPLE 3 according to the present invention, respectively.

EXAMPLE 1

Referring to FIGS. 1 through 3, an optical power monitor 100 of EXAMPLE 1 according to the present invention includes a pig-tail fiber 10 having two optical fibers 12, 13 aligned along an axis 11 parallel to and at a small distance from each other, and a columnar GRIN lens 20 having two opposite end faces 24 and 27, wherein one end face 24 of them faces a rear end face 14 of the pig-tail fiber at a predetermined spacing from the rear end face 14 of the pig-tail fiber, and the other end face 27 has a tap film 30 formed thereon, and a photo-diode 40 provided to be opposed to the tap film 30 of the columnar GRIN lens 20. The pig-tail fiber 10 is formed of a columnar glass into which the two optical fibers are inserted and fixed, and may be called "two-core capillary with optical fibers" or "two-core capillary glass ferrule with optical fibers". When one optical fiber 12 of the optical fibers 12 and 13 included in the pig-tail fiber 10 is an input optical fiber, the other optical fiber 13 becomes an output optical fiber, and the optical fibers pass through a small hole 18 drilled from a tip of the pig-tail fiber along the axis 11 and have their ends on the rear end face 14 of the pig-tail fiber. The rear end face 14 of the pig-tail fiber and the end face 24 of the columnar GRIN lens 20 opposed to and at the predetermined spacing from the rear end face 14 of the pig-tail fiber are angled faces 14a and 24a having a perpendicular line at an angle of 6° to 10°, preferably 8° relative to their axes 11 and 21, respectively, and thereby, light exiting from an end of the optical fiber may be prevented from going back to the same optical fiber due to reflection by the end face 24 of the columnar GRIN lens opposed to it. In the following description, the direction of the plane, unless otherwise specially described, is defined by a direction of the perpendicular line standing on the plane. The spacing between the rear end face 14 of the pig-tail fiber and the end face 24 of the columnar GRIN lens opposed to it is 100 μm to 300 μm, preferably 200 μm.

The columnar GRIN lens 20 means a "graded index lens", in which the refractive index continuously changes from the axis 21 of the lens 20 outward in the radial direction. Light progressing parallel to the axis 21 at a position away from the axis 21 of the GRIN lens 20 is deflected to the center direction of the lens, and therefore, light entering one end face 24 of the GRIN lens 20 is collimated to be emitted from near the center of the other end face 27. The tap film 30 provided on the end face 27 of the GRIN lens is a dielectric multilayer film laminated periodically with $SiO_2$ and $TiO_2$, and had a tap coefficient indicative of light transmission of 1%. Most of light reaching the tap film 30 through the GRIN lens 20 is reflected by a surface of the tap film to go back to the pig-tail fiber 10 passing through the GRIN lens 20. A part of light reaching the tap film 30 passes through the tap film 30. The light passing through the tap film 30 is detected by the photo-diode 40.

In the optical power monitor 100 of this example, as shown in FIG. 2, a part of an axial tip 25 of the angled face 24a of the GRIN lens 20 in the direction of the axis 21 is removed to form an arc-segmental end face 26 on the angled face 24a of the GRIN lens 20. A perpendicular line of the arc-segmental end face 26 is oriented to the direction of the axis 21 of the GRIN lens 20. For the arc-segmental end face 26, a height defined by a distance between a center of its circular arc and its chord is preferably 20 to 40% of a diameter of the GRIN lens. In the optical power monitor 100 of EXAMPLE 1, the GRIN lens 20 has the diameter of about 1.8 mm, and the height of the arc-segmental end face 26 is about 540 μm and so 30% of the diameter.

An end portion having the angled face 24a of the GRIN lens 20 is inserted into a through-hole 58 of a sleeve 50 (called "first sleeve") made of glass or ceramics. The first sleeve 50 has an end face 54 having a perpendicular line in the axis direction on one end thereof, and a circumference surface 29 of the GRIN lens 20 is bonded and fixed on an inner circumference surface of the first sleeve 50 so that the end face 54 is positioned in the same plane as the arc-segmental end face 26 of the GRIN lens 20. Here, the fact that the end face 54 of the first sleeve 50 and the arc-segmental end face 26 of the GRIN lens 20 are positioned in the same plane means that a projection of the arc-segmental end face 26 from the plane in which the end face 54 of the first sleeve 50 exists is within 20 μm and a retraction thereof is within 50 μm. Because the GRIN lens 20 is fixed in this way in the through-hole 58 of the first sleeve 50, the axis 21 of the GRIN lens 20 is perpendicular to the end face 54 of the first sleeve 50, in precision at an angle of within ±1° of a right angle.

Referring to FIGS. 1 and 3, another sleeve 60 (called "second sleeve") made of glass or ceramics has an end face 64 having a perpendicular line in its axis direction on one end thereof, and the pig-tail fiber 10 is fixed in a through-hole 68 of the second sleeve 60 so that the end face 64 is positioned on a side of the angled face 14a of the pig-tail fiber 10. Further, the end face 54 of the first sleeve 50 and the end face 64 of the second sleeve 60 are bonded and fixed to each other, so that the angled face 14a of the pig-tail fiber 10 and the angled face 24a of the GRIN lens 20 are opposed to each other at the predetermined spacing therebetween.

When the end face 54 of the first sleeve 50 and the end face 64 of the second sleeve 60 are bonded and fixed to each other so that the angled face 14a of the pig-tail fiber 10 and the angled face 24a of the GRIN lens 20 are disposed at the predetermined spacing therebetween, the tip of the angled face 14a of the pig-tail fiber 10 does not get into the first sleeve 50. This is because the tip 25 of the angled face 24a of the GRIN lens is removed to form the arc-segmental end face 26, and the pig-tail fiber 10 is positioned backward from the end face 64 of the second sleeve 60 to a side of the tip of the pig-tail fiber by a distance removed in the axial direction.

It has been stated previously that the height of the arc-segmental end face 26 is preferably 20 to 40% of the diameter of the GRIN lens. That is, when the height is below 20%, not only it may become difficult to position the arc-segmental end face and the end face of the first sleeve in the same plane, but the tip of the angled face of the pig-tail fiber may project by several tens μm from the end face of the second sleeve, because a distance by which the pig-tail fiber is positioned backward from the end face of the second sleeve is reduced. When the height of the arc-segmental end face 26 exceeds 40% of the diameter of the GRIN lens, light emitted from the end of the optical fiber of the pig-tail fiber is more reflected by the arc-segmental end face 26 oriented to the axis direction.

The photo-diode 40 is provided to face the tap film 30 formed on the rear end of the GRIN lens 20. The photo-diode 40 and the GRIN lens 20, further, are connected to each other by another sleeve 70 (called "third sleeve"), the circumference surface 29 near the rear end of the GRIN lens 20 is bonded to an inner circumference surface near a tip of the third sleeve 70, and further, on a rear end of the third sleeve 70, the photo-diode 40 is bonded and fixed. A condenser 42 is provided in front of the photo-diode 40 so that light passing through the tap film 30 is focused on the photo-diode 40. An optical signal detected by the photo-diode 40 is converted into an electric signal to measure the energy of light.

Referring to FIG. 4, assembling processes for the optical power monitor 100 of EXAMPLE 1 will be described. A lens unit 82 shown in FIG. 4B is assembled, as shown in FIG. 4A, by inserting the GRIN lens 20 into the through-hole 58 of the first sleeve 50, and bonding using adhesive agent and fixing the first sleeve 50 on the GRIN lens 20 so that the arc-segmental end face 26 on the angled face 24a of the GRIN lens 20 and the end face 54 of the first sleeve 50 are positioned in the same plane. Separately, as shown in FIG. 4C, the pig-tail fiber 10 is inserted into the through-hole 68 of the second sleeve 60 to assemble a fiber unit 84. The second sleeve 60 is not yet bonded to the pig-tail fiber 10. Separately, as shown in FIG. 4D, it is preferable to prepare a diode unit 86 by inserting the photo-diode 40 into the third sleeve 70, and bonding and fixing it. Subsequently, as shown in FIG. 4E, the lens unit 82 is attached onto an assembly jig 90, and the fiber unit 84 is attached onto a table 95 so that the angled face 24a of the GRIN lens 20 and the angled face 14a of the pig-tail fiber 10 face each other at a predetermined spacing therebetween. In FIG. 4E, the X axis of the assembly jig 90 in the Cartesian coordinate system is nearly aligned with the axis 21 of the GRIN lens 20 and the axis 11 of the pig-tail fiber 10. While light is lead to one of the optical fibers of the pig-tail fiber 10 to be reflected by the tap film 30 on the rear end of the GRIN lens 20 and the strength of light emitted from the other of the optical fibers is measured using a photometer not shown, a position of the pig-tail fiber 10 is adjusted so that the strength of the outgoing light is maximized, by moving the table 95 having the fiber unit 84 mounted thereon in the X, Y and Z axis directions and rotating it around the X axis, or rotating it slightly around the Y axis or the Z axis. When the pig-tail fiber 10 is positioned optimally relative to the GRIN lens 20, the end face 64 of the second sleeve 60 is bonded and fixed to the end face 54 of the first sleeve 50, and the pig-tail fiber 10 is bonded and fixed in the through-hole 68 of the second sleeve 60, and thereby, a fiber lens unit 88 is completed as shown in FIG. 4F. This fiber lens unit 88 is assembled with the diode unit 86 prepared in advance and bonded to each other to form the optical power monitor 100 of EXAMPLE 1. A circumference of the optical power monitor 100 is covered with a heat shrinkable tube having a light blocking effect.

In the assembling process for the optical power monitor 100 described above, the first sleeve 50 is fixed on the GRIN lens 20 so that the arc-segmental end face 26 of the GRIN lens 20 is positioned in the same plane as the end face 54 of the first sleeve 50, and while the second sleeve 60 is not yet attached to the pig-tail fiber 10, the position of the pig-tail fiber 10 is adjusted relative to the GRIN lens 20. However, when the pig-tail fiber is provided with the arc-segmental end face, the second sleeve is fixed on the pig-tail fiber so that the arc-segmental end face of the pig-tail fiber is positioned in the same plane as the end face of the second sleeve; the first sleeve is not yet bonded to the GRIN lens so that a position of the GRIN lens may be adjusted relative to the pig-tail fiber.

FIG. 5A shows a cross-sectional view of a main portion (fiber lens unit) of an optical power monitor 500 of a comparative example. The optical power monitor 500 of the comparative example has the same structure and dimensions as the optical power monitor 100 of EXAMPLE 1. However, in the optical power monitor 500, any of a GRIN lens 20' and the pig-tail fiber 10 does not have an arc-segmental end face on their angled face 24a' and 14a, and the angled faces 24a' and 14a are completely elliptical. In FIG. 5A, the GRIN lens 20' is bonded and fixed in the through-hole 58 of the first sleeve 50 so that an axial tip 25' of the angled face 24a' of the GRIN lens 20' is positioned in the plane formed by the end face 54 of the first sleeve 50. A value w of a spacing between the angled face 24a' of the GRIN lens 20' and the angled face 14a of the pig-tail fiber 10 is set to 200 μm like the case of the optical power monitor 100 of EXAMPLE 1, and so the tip of the angled face 14a of the pig-tail fiber 10 may not be fully accepted in the second sleeve 60 and project from the end face 64 of the second sleeve 60 to get further into the first sleeve 50.

In the optical power monitor 500 of the comparative example, since the angled face 24a of the GRIN lens 20' does not have the arc-segmental end face, an axis 21' of the GRIN lens 20' is inclined from the axis of the first sleeve 50, and so the axis 21' of the GRIN lens 20' may not be at a right angle relative to the end face 54 of the first sleeve 50, even if a tip 25' of the angled face of the GRIN lens 20' is positioned in the same plane as the end face 54 of the first sleeve 50 as shown in FIG. 5B. When the end face 64 of the second sleeve 60 is fitted with the end face 54 of the first sleeve 50 to be fixed, in order to find out an optimal position of the pig-tail fiber 10, it is necessary to angle it relative to the first sleeve 50 and the second sleeve 60, and then, if the pig-tail fiber 10 is inclined relative to these sleeves 50 and 60, the pig-tail fiber 10 may be brought into contact with the sleeves 50, 60 at a point z or z' as shown in FIG. 5B, and therefore the predetermined spacing between the angled faces 14a and 24a' may not be provided.

Two hundred optical power monitors 100 of EXAMPLE 1 and two hundred optical power monitors 500 of the comparative example were manufactured, respectively, and assembling man-hour and characteristics yield for them were compared. The assembling man-hour was an average man-hour of processing time of two hundred pieces for adjusting a position relationship between the fiber unit 84 and the lens unit 82 for centering while holding the predetermined spacing (200 μm), and it is represented as a ratio when the average man-hour of the comparative example was defined as 1. The characteristics yield was defined as a percentage in which a sum total of the number of optical power monitors of which value w of the spacing between the pig-tail fiber 10 and the GRIN lens 20 did not reach the predetermined value in the process shown in FIG. 4E and the number of them rejected on characteristics inspection after completion was divided by the number of products, i.e. 200. Table 1 shows the average man-hour and the characteristics yield. Provision of the arc-segmental end face in the GRIN lens increased a manufacturing cost of the GRIN lens by 10 to 20%, but the increase in the manufacturing cost of the GRIN lens could be well compensated with reduction of the assembling man-hour and improvement of the characteristics yield as shown in Table 1.

TABLE 1

|  | EXAMPLE 1 | Comparative example |
| --- | --- | --- |
| Average man-hour | 0.83 | 1 |
| Characteristics yield | 100% | 96% |
| Details for objections |  | Insufficient contact at the z portion: 6/200 |
|  |  | Insufficient contact at the z' portion: 2/200 |

EXAMPLE 2

FIG. 6 is a cross-sectional view showing a main portion (fiber lens unit) of an optical power monitor 200 of EXAMPLE 2. The optical power monitor 200 has the same structure and dimensions as the optical power monitor 100 of EXAMPLE 1. However, the optical power monitor 200 has an arc-segmental end face 16' in an axial direction of a pig-tail fiber 10' on a tip of an angled face 14a' of the pig-tail fiber 10', though the optical power monitor 100 has the arc-segmental end face 26 on the tip 25 of the angled face of the GRIN lens 20. The arc-segmental end face 16' of the pig-tail fiber 10' is positioned in the same plane as the end face 64 of the second sleeve 60 bonded to the pig-tail fiber 10', and the axis 11' of the pig-tail fiber 10' is perpendicular to the end face 64 of the second sleeve 60. A tip 25' of the angled face 24a' of the GRIN lens 20' is in a position set back from the end face 54 of the first sleeve 50. It will be understood that the optical power monitor 200 configured in this way has the same advantages as the optical power monitor 100 of EXAMPLE 1.

EXAMPLE 3

FIG. 7 is a cross-sectional view showing a main portion (fiber lens unit) of an optical power monitor 300 of EXAMPLE 3. In the optical power monitor 300, the pig-tail fiber 10' and the GRIN lens 20 both have the arc-segmental end faces 16', 26 on the tips of their angled faces 14a', 24a, respectively. Here, the arc-segmental end face 26 of the GRIN lens 20 is positioned in the same plane as the end face 54 of the first sleeve 50, and the axis 21 of the GRIN lens 20 is perpendicular to the end face 54 of the first sleeve 50. In the optical power monitor 300 of EXAMPLE 3, the arc-segmental end face 16' of the pig-tail fiber 10', instead of the GRIN lens 20, may be positioned in the same plane as the end face 64 of the second sleeve 60. It will be understood that the optical power monitor 300 has the same advantages as the optical power monitor 100 of EXAMPLE 1.

INDUSTRIAL APPLICABILITY

An optical power monitor is used for measuring the strength of an optical signal propagating in an optical fiber used for optical communication. The optical power monitor includes a pig-tail fiber and a GRIN lens, which face each other at a predetermined spacing therebetween and have an end face angled relative to an axis (angled face). In assembling of the optical power monitor, a position relationship between the pig-tail fiber and the GRIN lens is adjusted and they are bonded and fixed so that they are optimally positioned, that is, the strength of an optical signal outgoing from one of optical fibers of the pig-tail fiber is increased to a maximum with respect to the strength of the optical signal incident on the other of the optical fibers. In the optical power monitor according to the present invention, at least one of the pig-tail fiber and the GRIN lens has the arc-segmental end face in the axial direction on the tip of the angled face, and this arc-segmental end face is positioned in the same plane as the end face of the sleeve of the at least one in the axial direction, and thereby, the axis of the at least one is aligned perpendicular to the end face of the sleeve of the at least one in the axial direction. Accordingly, an axial tip of the other of the pig-tail fiber and the GRIN lens gets into the sleeve of the at least one and is not brought into contact with the inner wall of the sleeve of the at least one, and therefore, assembling man-hour needed for adjusting a relative position between the pig-tail fiber and the GRIN lens can be reduced and also, assembling yield can be improved.

The invention claimed is:

1. An optical power monitor comprising:
   a pig-tail fiber having two optical fibers aligned parallel to and at a small distance from each other and an end face having ends of the two optical fibers on the end face, the end face being an angled face having a perpendicular line at a certain angle with a pig-tail fiber axis;
   a columnar GRIN lens having two opposite end faces, one of which faces the angled face of the pig-tail fiber at a predetermined spacing with the angled face of the pig-tail fiber, and the other of which has a tap film formed on it,
   the one of the two opposite end faces being an angled face having a perpendicular line at a certain angle with a columnar GRIN lens axis;
   a first sleeve having a through-hole, in which the columnar GRIN lens is fixed, and an end face, which is disposed on a side of the angled face of the columnar GRIN lens and has a perpendicular line in an axial direction of the first sleeve;
   a second sleeve having a through-hole, in which the pig-tail fiber is fixed, and an end face, which is disposed on a side of the angled face of the pig-tail fiber, has a perpendicular line in an axial direction of the second sleeve, and is in contact with the end face of the first sleeve; and
   a photo-diode disposed to face the tap film of the columnar GRIN lens;
   wherein at least one element of the pig-tail fiber and the columnar GRIN lens has an arc-segmental end face with a perpendicular line in an axial direction of the element having the arc-segmental end face, and the arc-segmental end face is formed by removing a portion of an axial tip of the angled face of the element and positioned in a same plane as an end face of a sleeve in which the element is fixed.

2. An optical power monitor as set forth in claim 1, wherein the arc-segmental end face provided to the element has a height, which is defined by a distance between a center of an arc and a chord of the arc-segmental end face, of 20% to 40% of a diameter of the element..

3. An manufacturing method of an optical power monitor comprising:
   providing a pig-tail fiber having two optical fibers aligned parallel to and at a small distance from each other and an end face having ends of the two optical fibers on the end face, which is an angled face having a perpendicular line at a certain angle with a pig-tail fiber axis;
   a columnar GRIN lens having two opposite end faces, one of which is an angled face having a perpendicular line at a certain angle with a columnar GRIN lens axis, and the other of which has a tap film formed on it;
   at least one element of the pig-tail fiber and the columnar GRIN lens having an arc-segmental end face formed by removing a portion of an axial tip of the angled face of the element and having a perpendicular line in an axial direction of the element;
   a first sleeve having a through-hole for inserting the columnar GRIN lens, and an end face with a perpendicular line in an axial direction of the first sleeve;
   a second sleeve having a through-hole for inserting the pig-tail fiber, and an end face with a perpendicular line in an axial direction of the second sleeve; and
   a photo-diode;
   combining one of the pig-tail fiber and the columnar GRIN lens, which one has the arc-segmental end face, with a sleeve corresponding to the one, inserting the one into a through-hole of the sleeve and fixing the one in the sleeve to position the arc-segmental end face of the one in a same plane as the end face of the sleeve;
   combining the other of the pig-tail fiber and the columnar GRIN lens with a sleeve corresponding to the other, inserting the other into a through-hole of the sleeve to position the end face of the sleeve on a side of the angled face of the other;
   positioning the pig-tail fiber and the columnar GRIN lens so as to face the angled face of the pig-tail fiber to the angled face of the columnar GRIN lens, introducing an incidence light through one of the two optical fibers disposed in the pig-tail fiber, monitoring an output light from the other of the two optical fibers to adjust a position relationship between the pig-tail fiber and the columnar GRIN lens, and holding the pig-tail fiber and the columnar GRIN lens at a desirable position;
   fixing the other of the pig-tail fiber and the columnar GRIN lens in the through-hole of the sleeve corresponding to the other and the end face of the sleeve to an end face of the sleeve corresponding to the one at the position to assemble the pig-tail fiber and the columnar GRIN lens; and
   positioning the photo-diode to face the tap film of the columnar GRIN lens.

* * * * *